United States Patent
Owechko et al.

(10) Patent No.: US 8,744,200 B1
(45) Date of Patent: Jun. 3, 2014

(54) HYBRID COMPRESSIVE/NYQUIST SAMPLING FOR ENHANCED SENSING

(75) Inventors: Yuri Owechko, Newbury Park, CA (US); Swarup Medasani, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 204 days.

(21) Appl. No.: 13/464,887

(22) Filed: May 4, 2012

(51) Int. Cl.
*G06K 9/54* (2006.01)
*G06K 9/60* (2006.01)

(52) U.S. Cl.
USPC .......................... 382/232; 382/299

(58) Field of Classification Search
USPC ......... 382/232–233, 254, 260, 279, 280, 299, 382/312
See application file for complete search history.

(56) References Cited

U.S. PATENT DOCUMENTS

| | | | | |
|---|---|---|---|---|
| 7,532,772 B2* | 5/2009 | Brady | ............................ | 382/299 |
| 7,889,175 B2* | 2/2011 | Kryze et al. | .................. | 345/156 |
| 8,483,492 B2* | 7/2013 | Baraniuk et al. | ............. | 382/232 |
| 8,570,406 B2* | 10/2013 | Kelly et al. | ................... | 348/241 |

OTHER PUBLICATIONS

A. Ayvaci, M. Raptis, and S. Soatlo, "Sparse Occlusion Detection with Optical Fow". In International Journal of Computer Vision, 2011.

R, Marcia, Z. Harmany, and T. Willett,Compressive coded apetures for high-resolution imaging, Proceedings of 2010 SPIE Photonics Europe, Brussels, Belgium.

S. R. Gottesman and E. E. Fenimore, "New family of binary arrays for coded aperture imaging," Appl. Opt. 28, 1989.

Roummel Marcia, Zachary Harmany, and Rebecca Willett. "Compressive Coded Aperture Imaging," SPIE Electronic Imaging, 2009.

Tibshirani, R. (1996). Regression shrinkage and selection via the lasso. J. Royal. Statist. Soc B., vol. 58, No. 1, pp. 267-288).

Marcia and Willett in "Compressive Coded Aperture Superresolution Image Reconstruction" in IEEE Int. Conf. Acoustics, Speech and Signal Processing (ICASSP), 2008.

\* cited by examiner

*Primary Examiner* — Kanjibhai Patel
(74) *Attorney, Agent, or Firm* — Tope-McKay & Associates (57) ABSTRACT

Described is a knowledge-enhanced compressive imaging system. The system first initializes a compressive measurement basis set and a measurement matrix using task- and scene-specific prior knowledge. An image captured using the imaging mode of the dual-mode sensor is then sampled to extract context knowledge. The compressive measurement basis set and the measurement matrix are adapted using the extracted context knowledge and the prior knowledge. Task-relevant compressive measurements of the image are performed using the compressive measurement mode of the dual-mode sensor, and compressive reconstruction of the image is performed. Finally, a task and context optimized signal representation of the image is generated.

19 Claims, 4 Drawing Sheets

HYBRID COMPRESSIVE/NYQUIST SAMPLING FOR ENHANCED SENSING

BACKGROUND OF THE INVENTION (1) Field of Invention

The present invention relates to a knowledge-enhanced compressive imaging system and, more particularly, to a knowledge-enhanced compressive imaging system which uses a priori knowledge and compressive measurement (CM) techniques to reduce the number of data samples required.

(2) Description of Related Art

Data compression allows for compact storage and rapid transmission of large amounts of data. Compressed sensing is a technique for finding sparse solutions to underdetermined linear systems. In signal processing, compressed sensing is the process of acquiring and reconstructing a signal that is supposed to be sparse or compressible. In the field of image compression, current imaging systems perform direct Nyquist sampling of optical images using sensor arrays in which each detector element records a single pixel in the image. Each pixel is then digitized and stored in an array of pixel values, which can then be compressed. The Nyquist sampling theorem shows that a bandlimited analog signal that has been sampled can be perfectly reconstructed from a sequence of samples if the sampling rate exceeds 2B samples per unit distance, where B is the highest spatial frequency in the original signal. Conventional sampling is not adaptive to the task to be performed and is inefficient in hardware and computational resource utilization, because it stores information that is not necessarily needed for a particular task.

In addition, image resolution is limited by the physical number of detector elements, resulting in ever larger sensor arrays and onboard size, weight and power (SWAP)/bandwidth requirements as mission requirements increase. Compressive measurement (CM) has been a demonstrated viable alternative to Nyquist sampling by taking advantage of the fact that images have sparse representations for certain sets of basis functions. CM has been used to reconstruct images using far fewer measurements than predicted by the Nyquist sampling criterion by pre-processing with random measurement matrices and using sparity-enforcing optimization methods to reconstruct the image. Existing CM imaging systems, however, do not take advantage of prior knowledge about the data or the task to be performed with the imagery or real-time adaptation to the data, which limits the amount of SWAP and bandwidth reduction that can be achieved.

Thus, a continuing need exists for a knowledge-enhanced compressive imaging system that reduces the number of physical measurements needed to achieve a given level of task performance, thereby greatly increasing the utility of the sensing system while reducing SWAP and communication bandwidth requirements.

SUMMARY OF THE INVENTION

The present invention relates to a system for knowledge-enhanced compressive imaging comprising one or more processors and a memory having instructions such that when the instructions are executed, the one or more processors perform operations of initializing a compressive measurement basis set W and a measurement matrix R using prior knowledge, wherein the prior knowledge comprises task- and scene-specific prior knowledge. An image captured using a sensor is sampled at low resolution to extract context knowledge. The compressive measurement basis set W and the measurement matrix R are adapted using the extracted context knowledge and the prior knowledge. Task-relevant compressive measurements of the image are performed using the sensor. High resolution compressive reconstruction of the image is performed, and a task and context optimized signal representation of the image is generated.

In another aspect, the system further comprises a dual-mode sensor having an imaging mode and a compressive measurement mode, wherein the dual-mode sensor comprises an imaging sensor having an optical path with a compressive coded aperture (CCA) inserted into the optical path.

In another aspect, the system further performs an operation of performing a convolution operation on an image f to generate a measurement y according to the following equation:

$$y = Rf + \xi,$$

where $$R = DF^- C_H F,$$

and where $\xi$ denotes additive noise, D represents a downsampling operator, F represents a Fourier transform matrix, $C_H$ is a $n^2 \times n^2$ diagonal whose diagonal is the elements of H, where H is the Fourier transform of h, and where h is the non-negative transmission of the CCA.

In another aspect, the system further performs an operation of optimizing the task and context signal representation $\hat{f}$ of the image f according to the following: $\hat{f} = W\hat{\theta}$, where $\hat{\theta} = \arg\min_\theta (\|y - RW\theta\|_2^2 + \tau\|\theta\|_1)$, and where $\|\ldots\|$ denotes the norm of the element within $\|\ldots\|$, arg min represents an operation that determines the value of $\theta$ that minimizes the argument, $\tau$ denotes the relative weighting between the two norms, and $\theta$ represents a sparse coefficient vector.

In another aspect, the system further performs operations of:
generating a plurality of measurements y in parallel and adapting the plurality of measurements y in real-time.

In another aspect, the image comprises relevant data and irrelevant data, and the system further performs an operation of actively controlling the dual-mode sensor using the extracted context knowledge such that the extracted context knowledge is used to focus the dual-mode sensor on relevant data and filter out irrelevant data.

The present invention also comprises a device for knowledge-enhanced compressive imaging, comprising a dual-mode sensor having an imaging mode and a compressive measurement mode. The dual-mode sensor is configured to capture a low resolution image comprising relevant data and irrelevant data. The imaging mode is configured to extract context knowledge from the image. The dual-mode sensor is configured to switch to the compressive measurement mode to perform task-relevant compressive measurements of the image. A sensor control actively controls the dual-mode sensor using the extracted context knowledge, such that the extracted contextual knowledge is used to focus the dual-mode sensor on relevant data and filter out irrelevant data.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for knowledge-enhanced compressive imaging which uses a priori knowledge and compressive measurement (CM) techniques to reduce the number of data samples required. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for knowledge-enhanced compressive imaging. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for knowledge-enhanced compressive imaging. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details

The present invention is a system, method, and computer program product for knowledge-enhanced compressive imaging, which utilizes task-related knowledge that is based not only on prior knowledge of the signal and task to be performed, but also on the real-time task-related relationship of the signal to its environment (i.e., its context). This general framework is applied to the compressive imaging application by adapting compressive measurement (CM) basis functions and measurement matrices using both task and scene-specific knowledge. The system simultaneously filters out information in the visual scene that is not necessary for the task (i.e., nuisance factors), thereby focusing representation resources on task-relevant information.

Further, a distinguishing feature of the architecture described herein is a dual-mode imaging/compressive camera. After learning a task-specific basis set, the camera is used in a low resolution imaging mode to gather scene-specific contextual knowledge for further adaptation of the representation in order to focus representation resources on task-relevant objects. The camera is then switched in a ping-pong fashion, as required, to compressive measurement mode to perform the task using a much higher effective resolution due to the adapted representation, as will be described in further detail below. The invention is applicable to any type of CM sensing system, non-limiting examples of which include electro-optic and hyperspectral imaging systems.

Figure 1:
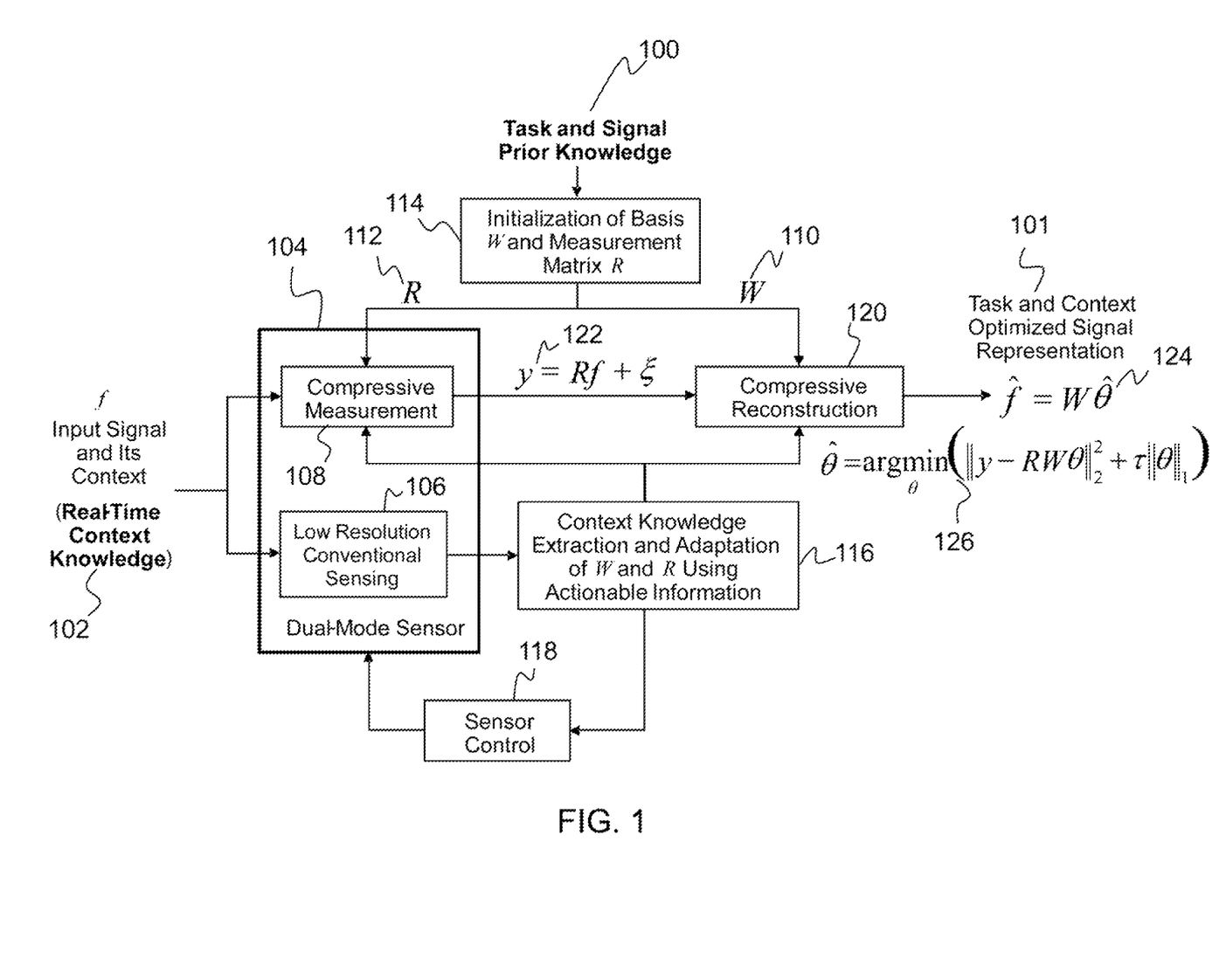
FIG. 1 is a flow diagram depicting a knowledge-enhanced compressive imaging system according to the present invention.

The dual-mode context-aware knowledge-enhanced compressive imaging framework of the present invention is illustrated in FIG. 1. The system uses both task and signal prior knowledge 100 and real-time context knowledge 102 to adapt the CM representation. This is performed using a dual-mode sensor 104 that functions in both non-compressive, low resolution conventional sensing 106 as well as compressive measurement 108 modes to adapt the sparse basis sets W 110 and measurement matrix R 112.

As shown in FIG. 1, knowledge of the task to be performed using CM, such as recognition or object-specific scene enhancement for a human observer, is used to construct and initialize task-specific CM basis sets W and measurement matrices R 114. Details regarding computation of W and R can be found in Marcia et al. in "Compressive Coded Aperture Imaging" in SPIE Electronic Imaging, 2009 (hereinafter referred to as Marcia 2009), and in Marcia and Willett in "Compressive Coded Aperture Superresolution Image Reconstruction" in IEEE Int. Conf. Acoustics, Speech and Signal Processing (ICASSP), 2008 (hereinafter referred to as Marcia and Willett), both of which are hereby incorporated by reference as though fully set forth herein. The dual-mode sensor 104 is then used in conventional sensing 106 mode to gather real-time context knowledge 102 for further adaptation of the basis set and measurement matrix to the signal and its environment (i.e., context knowledge extraction and adaptation of W and R using actionable information 116).

The dual-mode sensor 104 then switches to compressive measurement 108 mode with the CM representation adapted to both task and signal prior knowledge 100 and the current signal context, which enables highly specific and sparse knowledge-based representations. The context knowledge extraction and adaptation of W and R using methods such as actionable information 116 that occurs in the conventional sensing 106 mode can also be used for active sensor control 118, which is useful for focusing the dual-mode sensor 104 on relevant data (i.e., the highest likelihood regions of the signal domain) and resolving irrelevant data (i.e., task-irrelevant "nuisances" or distortions) for further customization of the representation.

The measurement overhead to gather real-time context knowledge 102 is more than compensated for by the highly efficient representations that result from using a CM basis set W 110 and measurement matrix R 112 that is customized to the task, signal prior, and real-time signal environment, resulting in far fewer measurements than conventional CM. This paradigm is generally applicable for all types of knowledge-enhanced compressive measurement applications, non-limiting examples of which include electro-optic and hyperspectral imaging systems.

The easily programmable nature of the physical system, coupled with recent advances in online reconstruction and estimation methods, provide a framework for a CM system that can adapt to a dynamic environment with changing sensing and noise conditions, relative motion of potential targets and occluders, and changes in the perspective or field of view. The processing flow for the hybrid knowledge-enhanced compressive measurement system described herein consists of the following stages. An initial task-specific basis set is first implemented using prior knowledge, including learning from training examples (initialization of basis W and measurement matrix R 114). Measures of task-relevant information (based, for example, on the theory of actionable information) are used to organize the basis set into orbits or groupings that correspond to various "nuisances" or data distortions, such as occlusions that are irrelevant to the task to be performed. The theory of actionable information is described by Ayyaci et al. in "Sparse Occlusion Detection with Optical Flow", International Journal of Computer Vision, 2011, which is hereby incorporated by reference as though fully set forth herein.

The dual-mode imaging sensor 104 (e.g., camera), that can quickly switch between normal imaging and compressive imaging, then samples the scene in low resolution conventional sensing 106 mode in order to detect contextual information. Context information (knowledge) is extracted and used to adapt W and R 116 using actionable information. A non-limiting example of contextual information includes occlusion boundaries using tools from convex optimization in combination with multiple views and/or by using three-dimensional sensing methods. In one aspect, multiple views can be generated using two dual-mode sensors 104 with differing viewpoints or by active sensor control 118. Occlusion boundary detection is important because it can be used to further restrict the basis set W 110 and focus representation resources on task-relevant objects in the scene.

After scene-specific adjustments of the basis set W 110, the corresponding measurement matrix R 112 is adjusted to ensure continued satisfaction of the Restricted Isometry Property (RIP) condition. The RIP characterizes matrices whose columns are nearly orthonormal. The dual-mode sensor 104 is then switched back to compressive measurement 108 mode, and task-relevant scene CM is performed. In one embodiment, the following convolution operation is performed on an image f to generate a measurement y 122:

$$y = Rf + \xi.$$

$\xi$ denotes additive noise. Compressive reconstruction 120 is performed to achieve a task and context optimized signal representation 101.

As shown, the optimized signal representation is represented by $\hat{f} = W\hat{\theta}$ 124, where $\hat{\theta}$ is a sparse coefficient vector that can be determined using $L_1$ norm minimization in order to reconstruct the image $\hat{f}$. The minimization is determined according to the following: $\hat{\theta} = \arg_\theta \min(\|y - RW\theta\|_2^2 + \tau\|\theta\|_1)$ 126, where $\tau$ denotes a relative weighting between the two norms, $\|\ldots\|$ denotes the norm of the element within $\|\ldots\|$, and arg min represents the operation that determines the value of $\theta$ that minimizes the argument. Thus, the system uses task and signal prior knowledge 100 and context knowledge to continuously adapt W and R 116. Then, in combination with compressive measurements made in the compressive measurement 108 mode and compressive reconstruction 120, the system determines the sparsest $\theta$ to obtain the optimized signal representation $\hat{f} = W\hat{\theta}$ 124.

Figure 2:
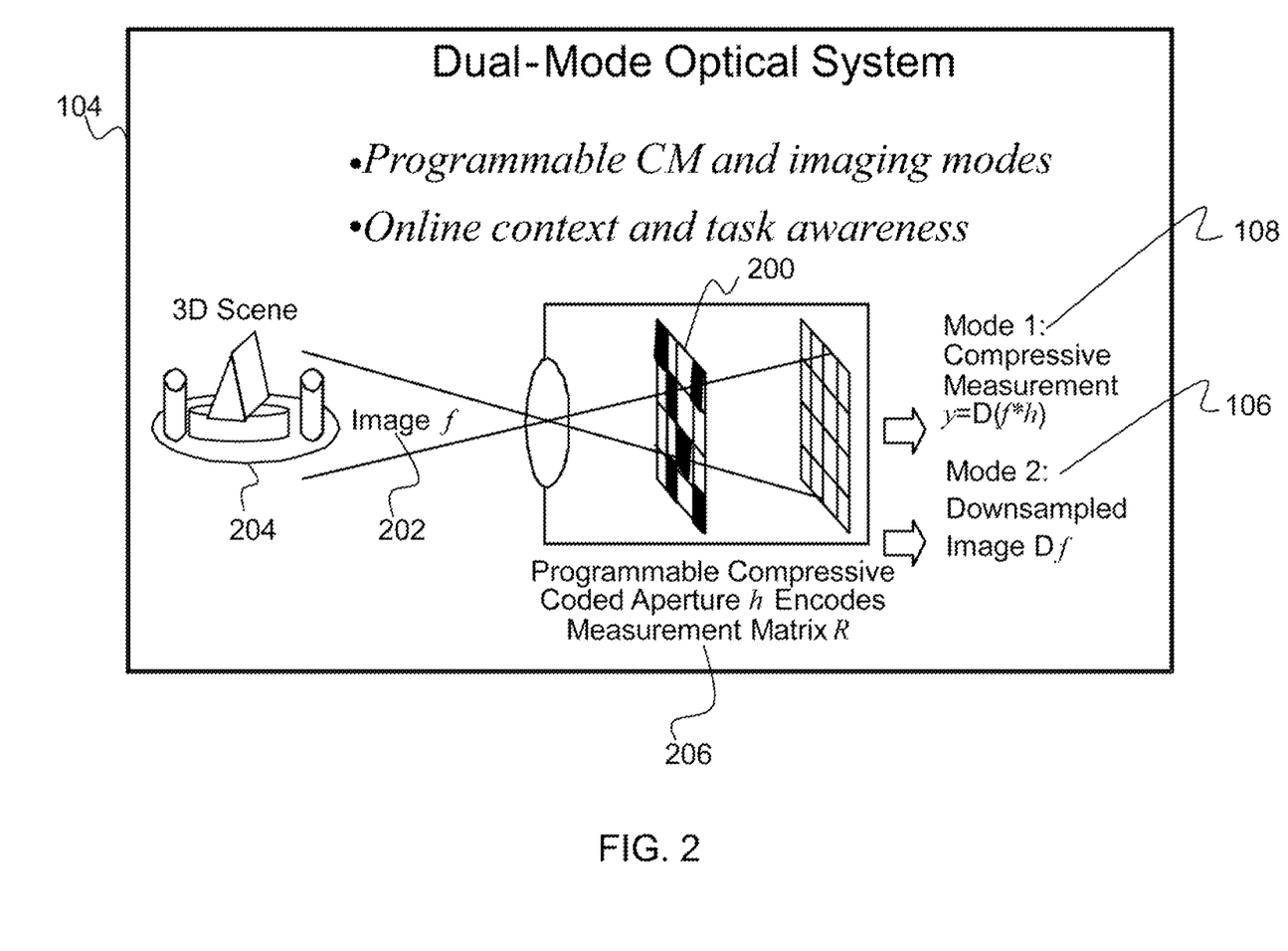
FIG. 2 is a diagram of a dual-mode sensor with switchable compressive and normal imaging modes according to the present invention.

A significant component of the architecture is that it enables the optical implementation of the dual-mode optical system (i.e., dual-mode sensor 104) shown in FIG. 2. The dual-mode sensor 104 is comprised of a conventional imaging sensor such as a charge-coupled device (CCD) array with a compressive coded aperture (CCA) 200 inserted in the optical path. The CCA 200 encodes the measurement matrix. The measurement matrix multiplication is performed optically using an optical convolution and downsampling operation based on work described in Marcia 2009 and by Marcia et al. in "Compressive Coded Apertures for High-Resolution Imaging" in Proceeding of 2010 SPIE Photonics, Europe, Brussels, Belgium (hereinafter referred to Marcia 2010), which is hereby incorporated by reference as though fully set forth herein. An advantage of the CCA 200 approach for optical implementation is that the CCA 200 is essentially a two-dimensional mask with variable sized openings, which makes it ideal for implementation using commercially available Digital Light Processing (DLP) microelectricalmechanical systems (MEMS) devices.

DLP devices are spatially and temporally programmable and can be switched at fast rates for updating the measurement matrix R. Spatial programmability can be used in the architecture to modify the spatial sampling characteristics and effective size of detector elements, which has been shown to be important for CM performance in the presence of noise. Time programmability can be used to perform compressive coding in the spatio-temporal domain. Finally, by programming the CCA 200 to be fully transmissive without individual apertures, the dual-mode sensor 104 (camera) can be easily switched to conventional sensing (imaging) mode for context sensing.

Coded apertures are multiplexing techniques developed to increase the amount of light hitting a detector in an optical system without sacrificing resolution. As illustrated in FIG. 2, at least one CCA 200 mask, such as an opaque rectangular plate with a specified pattern of openings that allows bright observations with relatively high signal-to-noise ratios, is used to encode an image 202 of a three-dimensional scene 204 before detection. A programmable compressive coded aperture h encodes a measurement matrix R 206, as will be described in further detail below. As described above, the dual-mode sensor consists of a conventional sensing 106 mode and a compressive measurement 108 mode, which extract contextual information and compress the image, respectively. The original image is then recovered from the distorted observation in post-processing using an appropriate reconstruction algorithm, a non-limiting example of which includes LASSO, as described by Tibshirani in "Regression Shrinkage and Selection Via the LASSO" in J. Royal. Statist. Soc B., Vol. 58, No. 1, pgs. 267-288, which is hereby incorporated by reference as though fully set forth herein.

Seminal work in coded aperture imaging includes the Modified Uniformly Redundant Arrays (MURAs), which are generally accepted as optimal mask patterns for coded aperture imaging, as described by Gottesman and Fenimore in "New Family of Binary Arrays for Coded Aperture Imaging" in Appl. Opt. 28, 1989, which is hereby incorporated by reference as though fully set forth herein. These mask patterns are binary, square patterns, whose grid size matches the spatial resolution of the photo-detector. In practice, the resolution of a detector array dictates the properties of the mask pattern and, hence, resolution at which the scene of interest can be reconstructed. This mask design and reconstruction results in minimal reconstruction errors at the focal plane array (FPA) resolution and is subject to the constraint of linear, convolution-based reconstruction methods.

Duke University has developed CCA techniques that utilize nonlinear sparsity-based reconstruction methods for high-resolution signal reconstruction from low-resolution observations, as described in Marcia 2010. Specifically, their multiplexing approach exploits recent theoretical work on Toeplitz- and circulant-structured matrices for CM so that the corresponding observation matrix satisfies the RIP with very high probability. The proposed masks are fast and memory-efficient to generate. In addition, the diagonalizability of block-circulant matrices with circulant blocks by the discrete Fourier transform leads to fast matrix-vector products that enable the reconstruction algorithms to solve the CM optimization problem very quickly. Most importantly, these masks satisfy the physical constraints (i.e., non-negativity and non-zero mean) that typically make it infeasible to actually measure many of the random projections described in the literature. The coded aperture optical path in the architecture of the present invention, as shown in FIG. 2, implements the following convolution operation on the image f 202:

$$y=D(f*h)+\xi,$$

where h is the non-negative transmission of the coded aperture and D is a sampling operator that measures $n^2$ samples. Let $C_H$ be an $n^2 \times n^2$ diagonal matrix whose diagonal is the elements of H, the Fourier transform of h, then the above equation can be written as:

$$y=Rf+\xi=RW\theta+\xi,$$

where $$R=DF^{-1}C_HF=DA$$

and F is the Fourier transform matrix. The measurement matrix R is $k \times n^2$ due to the downsampling operator D. For a given basis W, an A and corresponding CCA h can be defined such that the matrix product DA W satisfies RIP for $L_1$ minimization.

Using this procedure, the coded aperture h can be designed to implement the measurement matrix R=DA so that the sparse coefficient $\theta$ can be determined using $L_1$ norm minimization in order to reconstruct the image f. Unlike earlier compressive imaging systems, the coded aperture approach described herein generates all of the measurements y in parallel with real-time adaptability. Since h is implemented in the system using a commercially available programmable DLP micro-mirror device, the basis W, based on a learned prior basis from task-specific learning, can be adapted in real-time to the environment.

Figure 3:
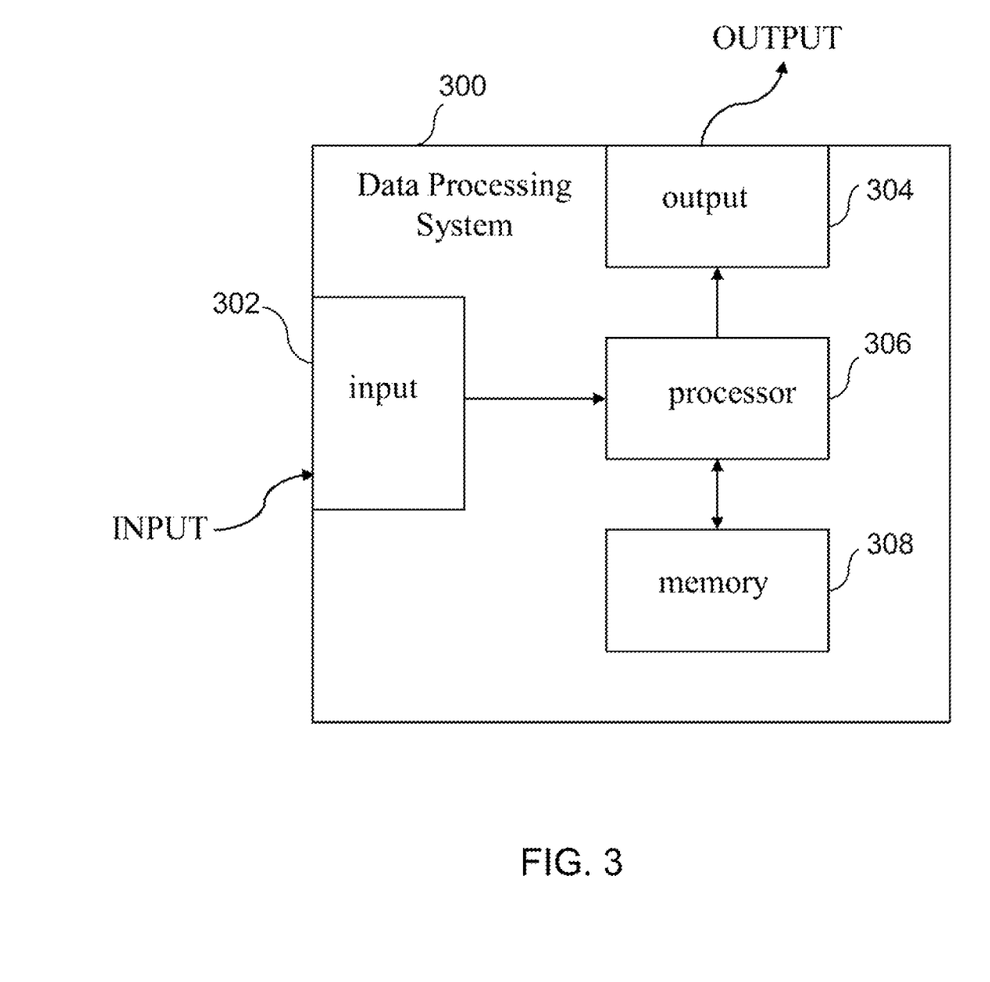
FIG. 3 is an illustration of a data processing system according to the present invention.

FIG. 3 illustrates a block diagram depicting components of a data processing system 300 (e.g., computer) incorporating the operations of the method described above and throughout the specification. The method utilizes a data processing system 300 for storing computer executable instructions (or instruction means) for causing a processor to carry out the operations of the above described method. The data processing system 300 comprises an input 302 for receiving information from a user. Information received may include input from devices such as cameras, scanners, keypads, keyboards, microphone, other peripherals such as storage devices, other programs, etc. The input 302 may include multiple "ports." An output 304 is connected with a processor 306 (or processors) for providing information for transmission to other data processing systems, to storage devices, to display devices such as monitors, to generating information necessary for delivery, and to other mechanisms for presentation in user-usable forms. The input 302 and the output 304 are both coupled with the processor 306, which may be a general-purpose computer processor or a specialized processor designed specifically for use with the present invention. The processor 306 is coupled with a memory 308 to permit storage of data and software to be manipulated by commands to the processor 306. The memory 308 includes instructions such that when the instructions are executed, the processor 308 (or processors) performs operations described above and throughout the specification.

Figure 4:
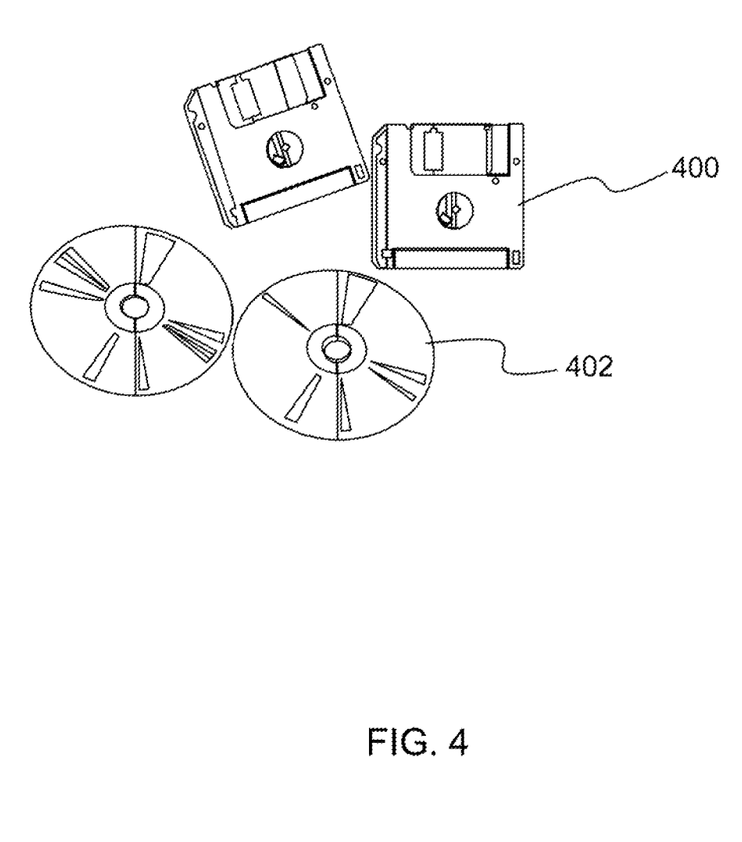
FIG. 4 is an illustration of a computer program product according to the present invention.

An illustrative diagram of a computer program product embodying the present invention is depicted in FIG. 4. As a non-limiting example, the computer program product is depicted as either a floppy disk 400 or an optical disk 402. However, as mentioned previously, the computer program product generally represents computer readable code (i.e., instruction means or instructions) stored on any compatible computer readable medium.

What is claimed is:

1. A system for knowledge-enhanced compressive imaging, the system comprising one or more processors and a memory having instructions such that when the instructions are executed, the one or more processors perform operations of:

initializing a compressive measurement basis set W and a measurement matrix R using prior knowledge, wherein the prior knowledge comprises task- and scene-specific prior knowledge;

sampling of a low resolution image captured with a sensor to extract context knowledge;

adapting the compressive measurement basis set W and the measurement matrix R using the extracted context knowledge and the prior knowledge;

performing task-relevant compressive measurements of the image with the sensor;

performing a high resolution compressive reconstruction of the image; and generating a task and context optimized signal representation of the image.

2. The system for knowledge-enhanced compressive imaging as set forth in claim 1, further comprising a dual-mode sensor having an imaging mode and a compressive measurement mode, wherein the dual-mode sensor comprises an imaging sensor having an optical path with a compressive coded aperture (CCA) inserted into the optical path.

3. The system for knowledge-enhanced compressive imaging as set forth in claim 2, wherein the system further performs an operation of performing a convolution operation on an image f to generate a measurement y according to the following equation:

$$y=Rf+\xi,$$

where $$R=DF^{-1}C_H F,$$

and where $\xi$ denotes additive noise, D represents a downsampling operator, F represents a Fourier transform matrix, $C_H$ is $n^2 \times n^2$ diagonal whose diagonal is the elements of H, where H is the Fourier transform of h, and where h is the non-negative transmission of the CCA.

4. The system for knowledge-enhanced compressive imaging as set forth in claim 3, wherein the system further performs an operation of optimizing the task and context signal representation $\hat{f}$ of the image f according to the following: $\hat{f}=W\hat{\theta}$, where $\hat{\theta}=\arg_\theta \min(\|y-RW\theta\|_2^2+\tau\|\theta\|_1)$, and where $\|\ldots\|$ denotes the norm of the element within $\|\ldots\|$, arg min represents an operation that determines the value of $\theta$ that minimizes the argument, $\tau$ denotes a relative weighting between the two norms, and $\theta$ represents a sparse coefficient vector.

5. The system for knowledge-enhanced compressive imaging as set forth in claim 4, wherein the system further performs operations of:

generating a plurality of measurements y in parallel; and
adapting the plurality of measurements y in real-time.

6. The system for knowledge-enhanced compressive imaging as set forth in claim 1, wherein the image comprises relevant data and irrelevant data, and wherein the system further performs an operation of actively controlling the dual-mode sensor using the extracted context knowledge such that the extracted context knowledge is used to focus the dual-mode sensor on relevant data and filter out the irrelevant data.

7. A computer-implemented method for knowledge-enhanced compressive imaging, comprising an act of:

causing a data processor to perform operations of:
initializing a compressive measurement basis set W and a measurement matrix R using prior knowledge, wherein the prior knowledge comprises task- and scene-specific prior knowledge;
sampling of a low resolution image captured with a sensor;
extracting context knowledge from the image with the sensor;
adapting the compressive measurement basis set W and the measurement matrix R using the extracted context knowledge and the prior knowledge;
performing task-relevant compressive measurements of the image with the sensor;
performing a high resolution compressive reconstruction of the image; and
generating a task and context optimized signal representation of the image.

8. The method for knowledge-enhanced compressive imaging as set forth in claim 7, wherein the sensor is a dual-mode sensor having an imaging mode and a compressive measurement mode, and wherein the dual-mode sensor comprises an imaging sensor having an optical path with a compressive coded aperture (CCA) inserted into the optical path.

9. The method for knowledge-enhanced compressive imaging as set forth in claim 8, further comprising an act of causing a data processor to perform an operation of performing a convolution operation on an image f to generate a measurement y according to the following equation:

$$y=Rf+\xi,$$

where $$R=DF^{-1}C_H F,$$

and where $\xi$ denotes additive noise, D represents a downsampling operator, F represents a Fourier transform matrix, $C_H$ is a $n^2 \times n^2$ diagonal whose diagonal is the elements of H, where H is the Fourier transform of h, and where h is the non-negative transmission of the CCA.

10. The method for knowledge-enhanced compressive imaging as set forth in claim 9, further comprising an act of causing a data processor to perform an operation of optimizing the task and context signal representation $\hat{f}$ of the image f according to the following: $\hat{f}=W\hat{\theta}$, where $\hat{\theta}=\arg_\theta \min(\|y-RW\theta\|_2^2+\tau\|\theta\|_1)$, and where $\|\ldots\|$ denotes the norm of the element within $\|\ldots\|$, arg min represents an operation that determines the value of $\theta$ that minimizes the argument, $\tau$ denotes a relative weighting between the two norms, and $\theta$ represents a sparse coefficient vector.

11. The method for knowledge-enhanced compressive imaging as set forth in claim 10, further comprising an act of causing a data processor to perform operations of:

generating a plurality of measurements y in parallel; and
adapting the plurality of measurements y in real-time.

12. The method for knowledge-enhanced compressive imaging as set forth in claim 7, wherein the image comprises relevant data and irrelevant data, and wherein the method further comprises an act of causing a data processor to perform an operation of actively controlling the dual-mode sensor using the extracted context knowledge, such that the extracted context knowledge is used to focus the dual-mode sensor on the relevant data and filter out the irrelevant data.

13. A computer program product for knowledge-enhanced compressive imaging, the computer program product comprising:

computer-readable instruction means stored on a non-transitory computer-readable medium that are executable by a computer having a processor for causing the processor to perform operations of:
initializing a compressive measurement basis set W and a measurement matrix R using prior knowledge, wherein the prior knowledge comprises task- and scene-specific prior knowledge;
sampling of a low resolution image captured with a sensor;
extracting context knowledge from the image with the sensor;
adapting the compressive measurement basis set W and the measurement matrix R using the extracted context knowledge and the prior knowledge;
performing task-relevant compressive measurements of the image with the sensor;

performing a high resolution compressive reconstruction of the image; and generating a task and context optimized signal representation of the image.

14. The computer program product for knowledge-enhanced compressive imaging as set forth in claim 13, wherein the sensor is a dual-mode sensor having an imaging mode and a compressive measurement mode, and wherein the dual-mode sensor comprises an imaging sensor having an optical path with a compressive coded aperture (CCA) inserted into the optical path.

15. The computer program product for knowledge-enhanced compressive imaging as set forth in claim 14, further comprising instruction means for causing a processor to perform an operation of performing a convolution operation on an image f to generate a measurement y according to the following equation:

$$y = Rf + \xi,$$

where $$R = DF^{-1} C_H F,$$

and where $\xi$ denotes additive noise, D represents a downsampling operator, F represents a Fourier transform matrix, $C_H$ is a $n^2 \times n^2$ diagonal whose diagonal is the elements of H, where H is the Fourier transform of h, and where h is the non-negative transmission of the CCA.

16. The computer program product for knowledge-enhanced compressive imaging as set forth in claim 15, further comprising instruction means for causing a processor to perform an operation of optimizing the task and context signal representation $\hat{f}$ of the image f according to the following: $\hat{f} = W\hat{\theta}$, where $\hat{\theta} = \arg_\theta \min(\|y - RW\theta\|_2^2 + \tau \|\theta\|_1)$, and where $\|\ldots\|$ denotes the norm of the element within $\|\ldots\|$, arg min represents an operation that determines the value of $\theta$ that minimizes the argument, $\tau$ denotes a relative weighting between the two norms, and $\theta$ represents a sparse coefficient vector.

17. The computer program product for knowledge-enhanced compressive imaging as set forth in claim 16, further comprising instruction means for causing a processor to perform operations of:

generating a plurality of measurements y in parallel; and adapting the plurality of measurements y in real-time.

18. The computer program product for knowledge-enhanced compressive imaging as set forth in claim 13, wherein the image comprises relevant data and irrelevant data, and further comprising instruction means for actively controlling the dual-mode sensor using the extracted context knowledge, such that the extracted context knowledge is used to focus the dual-mode sensor on relevant data and filter out irrelevant data.

19. A device for knowledge-enhanced compressive imaging, comprising:

a dual-mode sensor having an imaging mode and a compressive measurement mode;

wherein the dual-mode sensor is configured to capture a low resolution image comprising relevant data and irrelevant data;

wherein the imaging mode is configured to extract context knowledge from the image;

wherein the dual-mode sensor is configured to switch to the compressive measurement mode to perform task-relevant compressive measurements of the image; and a sensor control for actively controlling the dual-mode sensor using the extracted context knowledge, such that the extracted contextual knowledge is used to focus the dual-mode sensor on relevant data and filter out irrelevant data.

* * * * *